US009860087B1

(12) United States Patent
Francese et al.

(10) Patent No.: US 9,860,087 B1
(45) Date of Patent: Jan. 2, 2018

(54) LOW POWER SPECULATIVE DECISION FEEDBACK EQUALIZER

(71) Applicant: International Business Machines Corporation, Armonk, NY (US)

(72) Inventors: Pier A. Francese, Adliswil (CH); Elisa Sacco, Romano Canavese (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/252,945

(22) Filed: Aug. 31, 2016

(51) Int. Cl.
*H03H 7/30* (2006.01)
*H04L 25/03* (2006.01)

(52) U.S. Cl.
CPC .. *H04L 25/03057* (2013.01); *H04L 25/03885* (2013.01); *H04L 25/03006* (2013.01)

(58) Field of Classification Search
CPC . H04B 1/40; H04B 3/23; H04B 1/403; H04B 1/30; H04B 1/28; H04L 27/2601; H04L 1/0025; H04L 25/03057; H04L 25/03038; H04L 25/03885; H04L 25/03159; H04L 2025/0349; H04L 27/2647; H04L 1/20; H04N 5/4401
USPC ................................. 375/229, 219, 316, 295
See application file for complete search history.

(56) References Cited

U.S. PATENT DOCUMENTS 7,539,243 B1  5/2009  Toifl et al.
8,477,833 B2  7/2013  Bulzacchelli et al.
8,693,531 B2  4/2014  Warke et al.
8,885,699 B2  11/2014  Gagnon
2014/0226707 A1* 8/2014  Kaviani ............ H04L 25/03063
 375/233
2014/0355661 A1* 12/2014  Chen ................. H04L 25/03146
 375/233

OTHER PUBLICATIONS

Ibrahim et al., "Low-Power CMOS Equalizer Design for 20-Gb/S Systems", IEEE Journal of Solid-State Circuits, vol. 46, Issue 6, Jun. 2011, Abstract Only.
Kim et al., "A 24-mW 28-Gb/S Wireline Receiver With Low-Frequency Equalizing CTLE and 2-TAP Speculative DFE", 2015 IEEE International Symposium on Circuits and Systems (ISCAS), May 2015, Abstract Only.
Payandehnia et al., "A 12.5Gb/S 6.6mW Receiver With Analog Equalizer and 1-TAP DFE", Microelectronics Journal, vol. 43, Issue 12, Dec. 2012, Abstract Only.
Payandehnia et al., "A 4mW 3-Tap 10 Gb/S Decision Feedback Equalizer", Conference Paper in Midwest Symposium on Circuits and Systems, Sep. 2011, Abstract Only.

* cited by examiner

*Primary Examiner* — Zewdu Kassa
(74) *Attorney, Agent, or Firm* — Cantor Colburn LLP; Daniel Morris

(57) ABSTRACT

Embodiments of the present invention may provide the capability for reducing power consumption in a speculative decision feedback equalizer by powering up the speculative path that is going to take the next decision based on the previous decision, and holding other paths in a reset low-power condition. For example, a Speculative Decision Feedback Equalizer may comprise a plurality of speculative paths, circuitry to provide power to a speculative path that will take the next decision based on the current decision, and circuitry to keep at least one other speculative path in a reset state with low or reduced power consumption.

16 Claims, 5 Drawing Sheets

LOW POWER SPECULATIVE DECISION FEEDBACK EQUALIZER

BACKGROUND

The present invention relates to techniques for reducing power consumption in a speculative decision feedback equalizer by powering up the speculative path that is going to take the next decision based on the previous decision, and holding other paths in a reset low or reduced power condition.

Decision feedback equalizers (DFEs) are typically used in the receivers of communication systems in order to equalize dispersion of the transmission channels. Speculation or loop-unrolling is a technique that implements all the possible weighted summations at the output of a finite impulse response (FIR) filter in the DFE feedback path in order to reduce the critical-path time of the DFE coefficients summation time. All the possible combinations of N post-cursors ISI terms are generated in a speculative decision feedback equalizer of order N so that a total of $2^N$ combinations or speculations are generated. The correct decision is selected among the $2^N$ speculations on the base of the last N decisions.

Due to hardware complexity that grows exponentially, speculation is typically implemented for the first tap, although speculation may be beneficial for additional taps in very high speed receivers running at tens of Gb/s. As the hardware complexity grows, the power consumption also grows.

Accordingly, a need arises for techniques by which the power consumption in a speculative decision feedback equalizer may be reduced.

SUMMARY

Embodiments of the present invention may provide the capability for reducing power consumption in a speculative decision feedback equalizer by powering up the speculative path that is going to take the next decision based on the previous decision, and holding other paths in a reset low or reduced power condition.

In an embodiment of the present invention, a Speculative Decision Feedback Equalizer may comprise a plurality of speculative paths, circuitry to provide power to a speculative path that will take the next decision based on the current decision, and circuitry to keep at least one other speculative path in a reset state with low or reduced power consumption. The Speculative Decision Feedback Equalizer may further comprise circuitry to keep all other speculative paths in a reset state with low or reduced power consumption. Each speculative path may comprise a dynamic comparator. The circuitry to provide power to a speculative path that will take the next decision based on the current decision and the circuitry to keep at least one other speculative path in a reset state with low or reduced power consumption may comprise clock gating and de-multiplexing select logic. The Speculative Decision Feedback Equalizer may further comprise circuitry to keep all other speculative paths in a reset state with low or reduced power consumption.

In an embodiment of the present invention, a Speculative Decision Feedback Equalizer may comprise a plurality of dynamic comparators, each dynamic comparator adapted to compare an input signal with a different speculative value of a previously determined signal and outputting a comparison result, a multiplexer adapted to select a comparison result based on the actual value of the previously determined signal, circuitry adapted to provide power to a dynamic comparator that is comparing the input signal with a speculative value of the previously determined signal that corresponds to the actual value of the previously determined signal and circuitry adapted to keep at least one other dynamic comparator in a reset state with low or reduced power consumption. The Speculative Decision Feedback Equalizer may further comprise circuitry adapted to keep all other speculative paths in a reset state with low or reduced power consumption. The circuitry adapted to provide power and the circuitry adapted to keep at least one other dynamic comparator in a reset state with low or reduced power consumption may comprise clock gating and de-multiplexing select logic. The Speculative Decision Feedback Equalizer may further comprise circuitry adapted to keep all other speculative paths in a reset state with low or reduced power consumption.

In an embodiment of the present invention, a communications device may comprise a communication channel and a Speculative Decision Feedback Equalizer in the communication channel. The Speculative Decision Feedback Equalizer may comprise a plurality of speculative paths, circuitry to provide power to a speculative path that will take the next decision based on the current decision, and circuitry to keep at least one other speculative path in a reset state with low or reduced power consumption. The communications device may further comprise circuitry to keep all other speculative paths in a reset state with low or reduced power consumption. Each speculative path may comprise a dynamic comparator. The circuitry to provide power to a speculative path that will take the next decision based on the current decision and the circuitry to keep at least one other speculative path in a reset state with low or reduced power consumption may comprise clock gating and de-multiplexing select logic. Each of the plurality of speculative paths may comprise a dynamic comparator, each dynamic comparator adapted to compare an input signal on the communication channel with a different speculative value of a previously determined signal and outputting a comparison result, the circuitry adapted to provide power to a speculative path that will take the next decision based on the current decision comprises circuitry adapted to provide power to a dynamic comparator that is comparing the input signal with a speculative value of the previously determined signal that corresponds to the actual value of the previously determined signal, and the circuitry to keep at least one other speculative path in a reset state with low or reduced power consumption comprises circuitry adapted to keep at least one other dynamic comparator in a reset state with low or reduced power consumption. The Speculative Decision Feedback Equalizer may further comprise circuitry adapted to keep all other speculative paths in a reset state with low or reduced power consumption. The circuitry adapted to provide power and the circuitry adapted to keep at least one other dynamic comparator in a reset state with low or reduced power consumption comprise clock gating and de-multiplexing select logic. The Speculative Decision Feedback Equalizer may comprise circuitry to keep all other speculative paths in a reset state with low or reduced power consumption.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments of the present invention may provide the capability for reducing power consumption in a speculative decision feedback equalizer by powering up only the speculative path that is going to take the next decision based on the previous decision.

As transmitted telecommunication signals are carried through a transmission channel, distortion of and interference to the signal may occur. One significant form of such distortion is known as InterSymbol Interference (ISI). When ISI occurs, one or more transmitted symbols may interfere with other transmitted symbols, which may result in noise or distortion. ISI is typically caused by two mechanisms—multipath propagation or bandwidth limited channels. These mechanisms may cause the distinct symbols to blur or mix together, which may reduce signal clarity. Typically the transmitted/received symbols spread in time until they interfere with later transmitted/received symbols. When ISI occurs within a system, the received signal error rate may increase to unacceptable levels. Such error rates from ISI may be reduced through the use of adaptive equalization techniques and error correcting codes.

Equalization involves processing a received signal in order to reverse or remove distortion acquired by a signal transmitted through a channel. Typically, an equalizer at the receiver may apply a filter to affect the signal in a way that is the inverse of the way the transmission channel affected the signal, in order to reduce the effects of the channel and improve the ability to receive the signals. One equalization technique is known as adaptive equalization. An adaptive equalizer is an equalizer that automatically adapts to time-varying properties of the communication channel. A well-known example of an adaptive equalizer is the decision feedback equalizer (DFE), which is a filter that uses feedback of previously detected symbols to reduce the effects of ISI on the next symbol to be detected.

In a typical DFE, symbols are detected by circuitry that decides and outputs the most likely value of the symbol. This detection must be completed in time for the value of the previously detected symbol to be fed back, so as to affect detection of the next symbol. Typically, the data detection, feedback, and application must be completed in one symbol-to-symbol time period, or unit interval (UI). At high data rates, this may be difficult to achieve. Speculative DFE seeks to avoid this problem by pre-computing all possible effects of the previously detected symbol on the incoming symbol. Then the circuitry simply selects the correct pre-computed option based on the value of the previously detected symbol. With a one-tap DFE, this may require pre-computing two options. However, the number of options that must be computed grows exponentially as the number of taps increases, with concurrent increase in power consumption.

Figure 1:
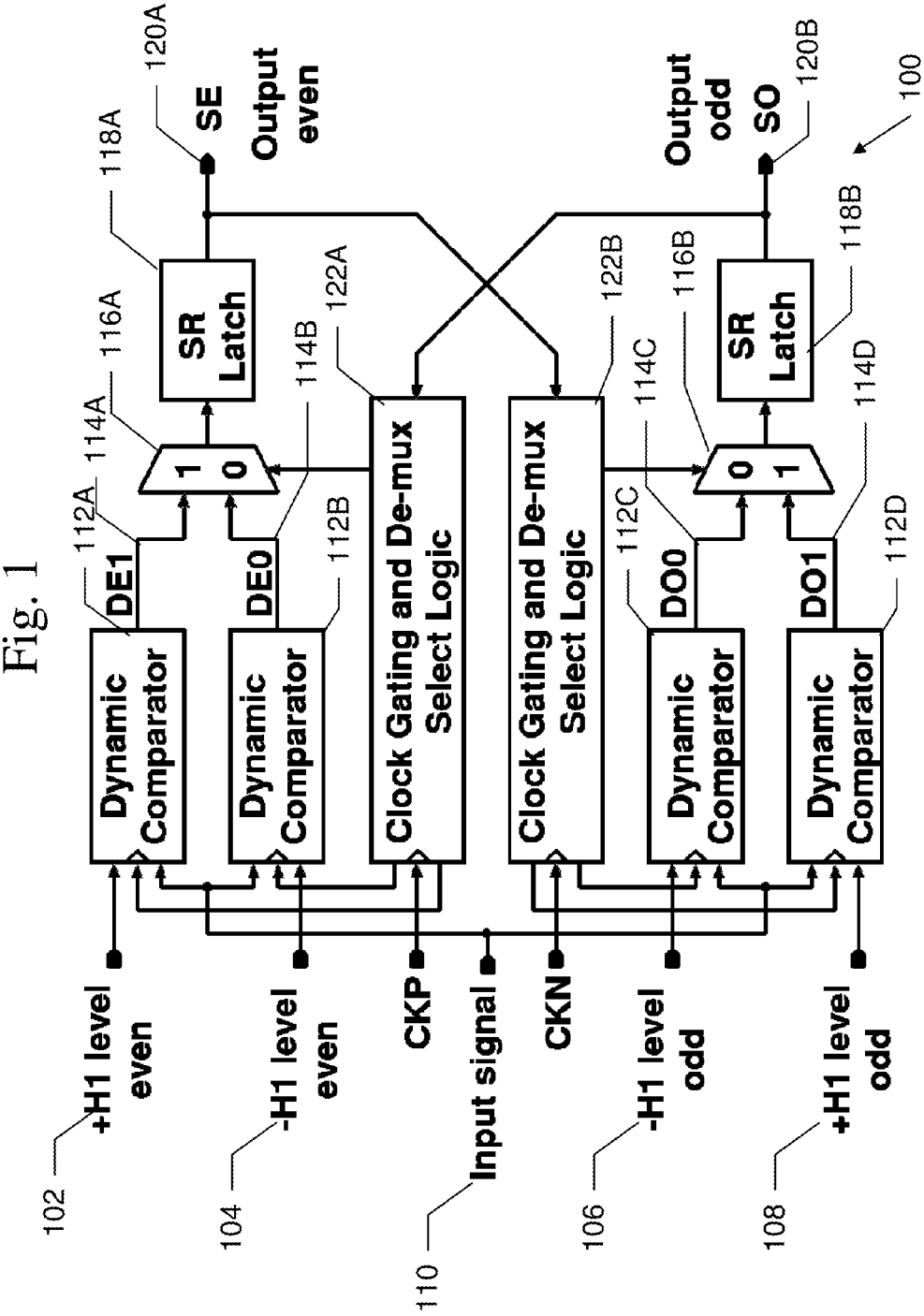
FIG. 1 is an exemplary block diagram of speculative DFE circuitry having reduced power consumption.

An example of speculative DFE circuitry 100 having reduced power consumption is shown in FIG. 1. In this example, an interleaved implementation for a 1-tap DFE, with a non-return-to-zero (NRZ) signaling format and half-rate processing, is shown. However, this is merely an example. The present invention is equally applicable to implementations including multi-taps DFE, multi-level signaling, such as PAM-4 (pulse-amplitude-modulation with 4-levels), and any rate processing, such as non-interleaved (full-rate), two-to-one interleaving (half-rate), four-to-one interleaving (quarter-rate), etc. In the example shown in FIG. 1, H1 is the level of the previously detected symbol. In this example, there are two possible values for each previously detected symbol, +H1 and −H1 Likewise, as this example uses half-rate processing, the processing is interleaved into even symbols and odd symbols. As shown in FIG. 1, the +H1 level 102 and −H1 level 104 for the even interleave, and the +H1 level 106 and −H1 level 108 for the odd interleave, along with the input signal 110, may be input to dynamic comparators 112A-D. Each dynamic comparator may compare the input signal 110 with the speculative level of the previously detected symbol, and output a resulting decision, such as DE1 114A, DE0 114B, DO0 114C, and DO1 114D. The speculatively determined symbols may be selected by multiplexers 116A, 116B, stored in latches 118A, 118B, and output 120A, 120B. The outputs SE 120A, SO 120B may be input to clock gating and de-multiplexing select logic blocks 122B, 122A respectively. Due to the interleaved implementation, even output SE 120A carries the previous symbol for the odd section of the circuitry, and so is input to odd clock gating and de-multiplexing select logic block 122B, and odd output SO 120B carries the previous symbol for the even section of the circuitry, and so is input to even clock gating and de-multiplexing select logic block 122A.

In operation, the data detection and computation of the DFE must be completed in one unit interval (UI) since the output result is needed for the clock gating and de-mux select logic of the next UI. For example, odd output SO 120B outputs its signal, which is input to clock gating and de-multiplexing select logic block 122A. Clock gating and de-multiplexing select logic block 122A performs its computations and outputs a signal to dynamic comparator 112A. Dynamic comparator 112A performs its detection and outputs a decision signal DE1 114A to multiplexer 116A. Likewise, clock gating and de-multiplexing select logic block 122A outputs a select signal to multiplexer 116A, which outputs the next output signal SE 120A. All of this computation and detection must be performed within one UI for proper operation of the DFE.

In an embodiment, only the speculative path that is going to take the next decision may be powered up by means of the previous decision. The other speculative paths may be kept in a reset state with low or reduced power consumption. For example, if even output 120A outputs a value such that DO0 114C would be selected, clock gating and de-multiplexing select logic block 112B may generate one or more signals so that dynamic comparator 112C may be powered up and may provide output DO0 114C, and clock gating and de-multiplexing select logic block 112B may generate one or more signals so that dynamic comparator 112D may be kept in a reset state with low or reduced power consumption. Likewise, if even output 120A outputs a value such that DO1 114D would be selected, clock gating and de-multiplexing select logic block 112B may generate one or more signals so that dynamic comparator 112D may be powered up and may provide output DO1 114D, and clock gating and de-multiplexing select logic block 112B may generate one or more signals so that dynamic comparator 112C may be kept in a reset state with low or reduced power consumption. The clock gating and de-multiplexing select logic blocks may include a clock gating function operable to power up only one of the comparators in the speculative paths.

Figure 2:
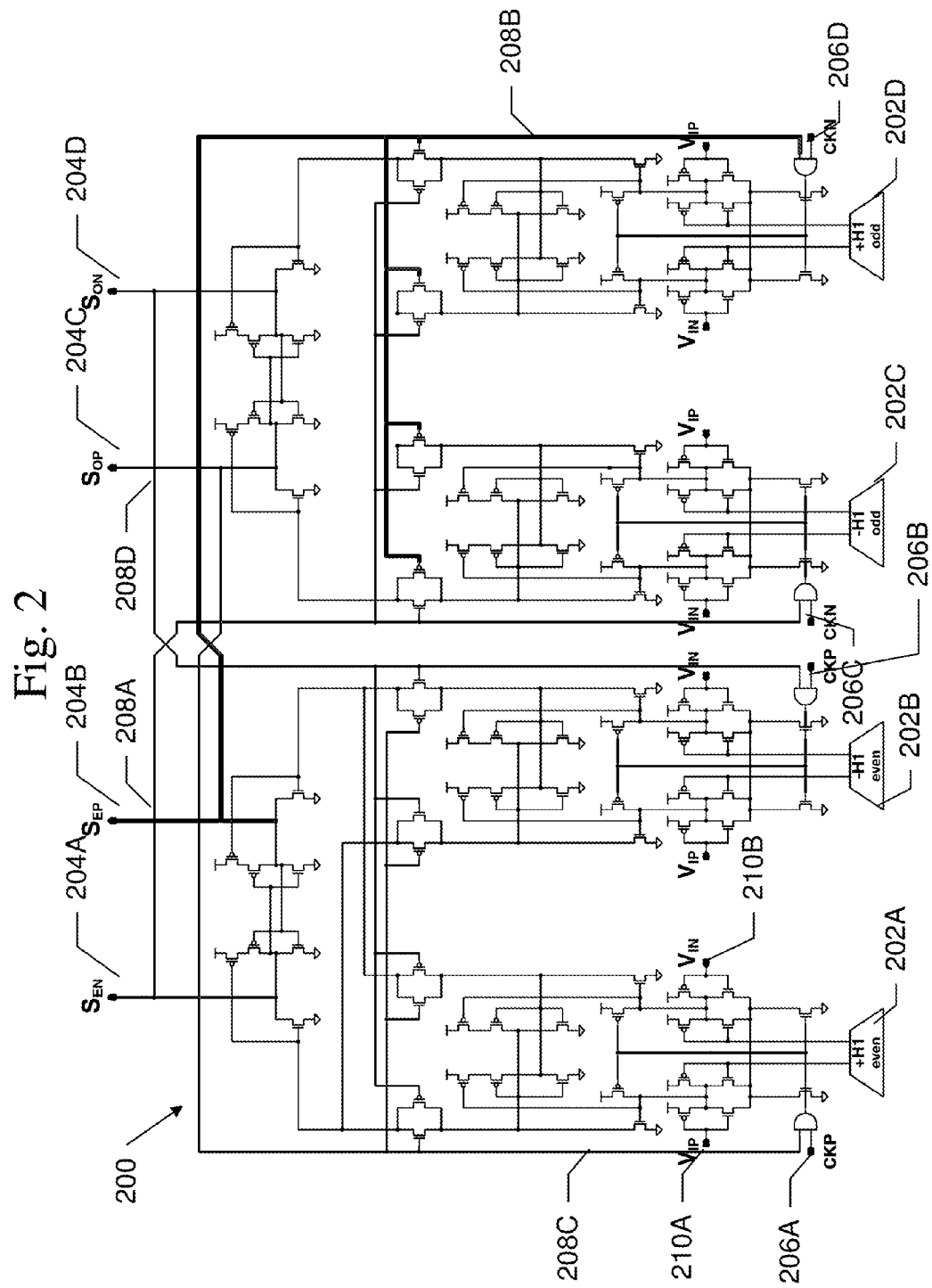
FIG. 2 is an exemplary circuit diagram of an embodiment of speculative DFE circuitry.

An exemplary circuit diagram of an embodiment of speculative DFE circuitry 200 is shown in FIG. 2. As shown in this example, there are inputs for the +H1 level 202A and −H1 level 202B for the even interleave, and the −H1 level 202C and +H1 level 202D for the odd interleave. There are outputs including even output negative polarity $S_{EN}$ 204A, even output positive polarity $S_{EP}$ 204B, odd output positive polarity $S_{OP}$ 204C, and odd output negative polarity $S_{ON}$ 204D. There are clock inputs including positive clock inputs 206A, 206C and negative clock inputs 206B, 206D. The input signal positive polarity $V_{IP}$ 210A and input signal negative polarity $V_{IN}$ 210B are input to each circuit block as well. Signal 208C from odd output positive polarity $S_{OP}$ 204C is connected to various inputs and gated with positive clock input 206A to provide a clock gating function operable to power up or power down the associated dynamic comparator. Signal 208D from odd output negative polarity $S_{ON}$ 204D is connected to various inputs and gated with positive clock input 206B to provide a clock gating function operable to power up or power down the associated dynamic comparator. Signal 208A from even output negative polarity $S_{EN}$ 204A is connected to various inputs and gated with positive clock input 206C to provide a clock gating function operable to power up or power down the associated dynamic comparator. Signal 208B from even output positive polarity $S_{EP}$ 204B is connected to various inputs and gated with positive clock input 206D to provide a clock gating function operable to power up or power down the associated dynamic comparator.

Figure 3:
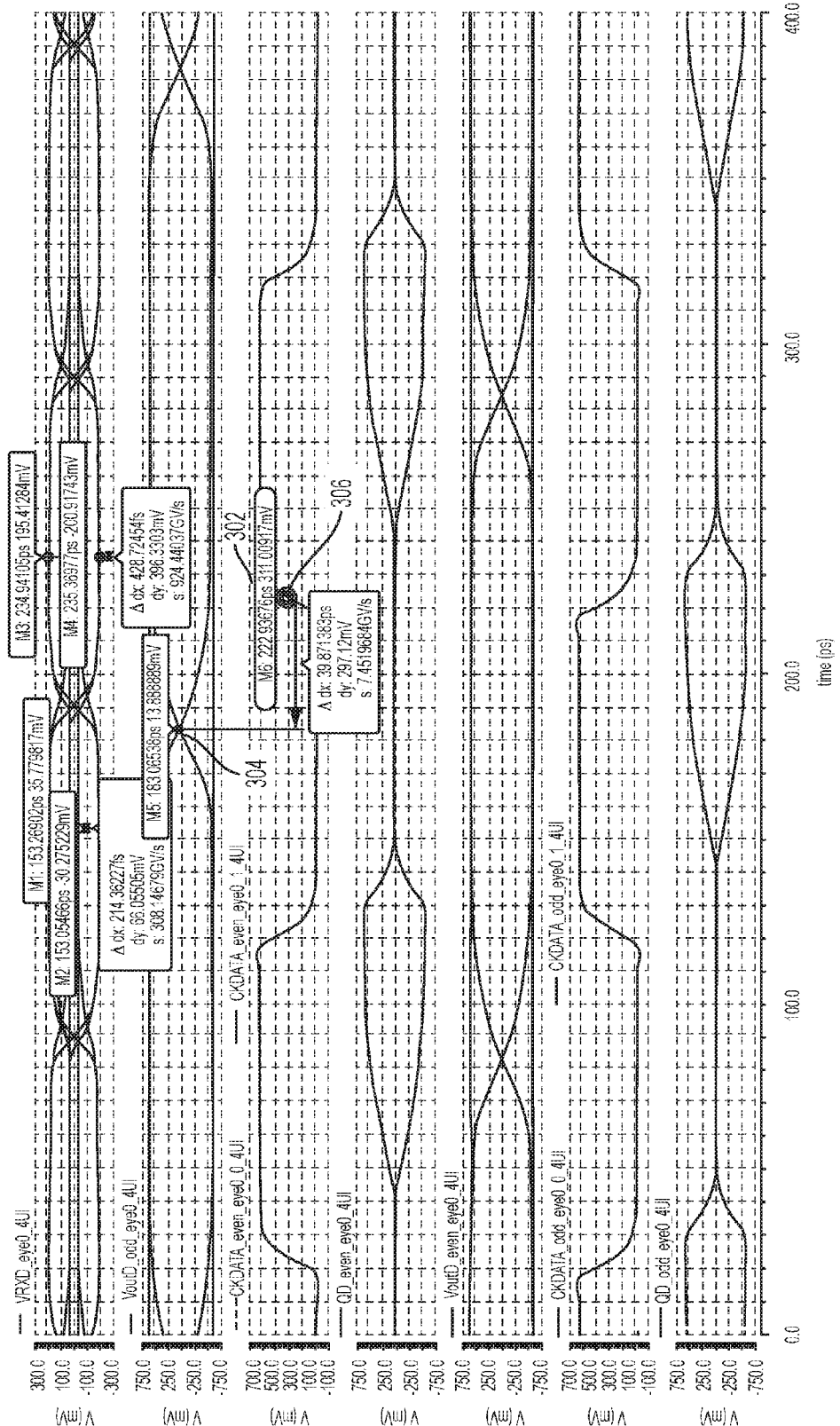
FIG. 3 is an exemplary eye diagram of operation of an embodiment of speculative DFE circuitry.

An exemplary eye diagram of operation of the embodiment of speculative DFE circuitry 200 shown in FIG. 2 is shown in FIG. 3. As shown in this example, the salient point is the timing margin 302 from the time the output is determined 304 to the next clock edge 306. In this example, a timing margin 302 of about 40 ps is achieved.

Figure 4:
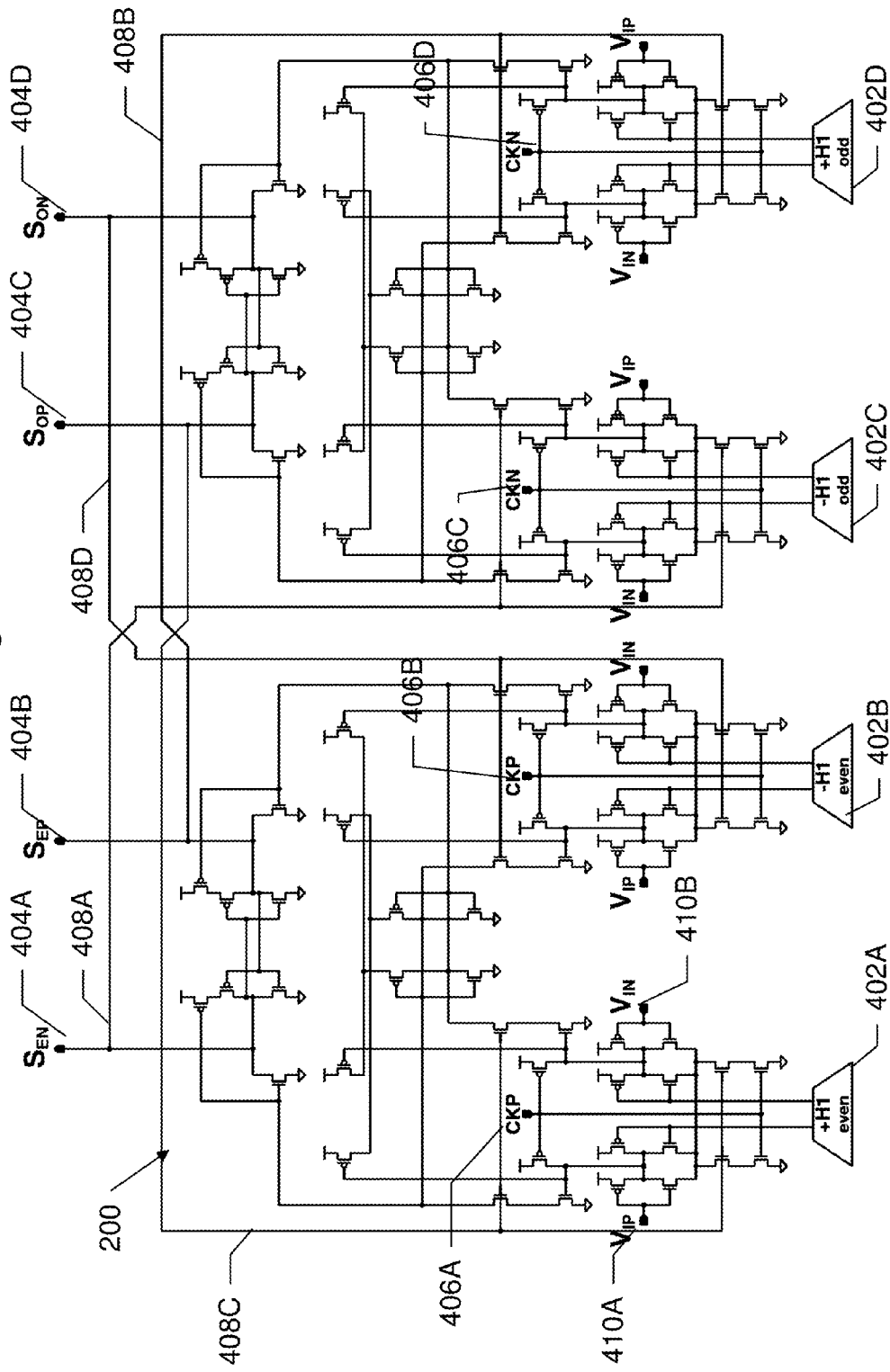
FIG. 4 is an exemplary circuit diagram of an embodiment of speculative DFE circuitry.

An exemplary circuit diagram of an embodiment of speculative DFE circuitry 400 is shown in FIG. 4. As shown in this example, there are inputs for the +H1 level 402A and −H1 level 402B for the even interleave, and the −H1 level 402C and +H1 level 402D for the odd interleave. There are outputs including even output negative polarity $S_{EN}$ 404A, even output positive polarity $S_{EP}$ 404B, odd output positive polarity $S_{OP}$ 404C, and odd output negative polarity $S_{ON}$ 404D. There are clock inputs including positive clock inputs 406A, 406B and negative clock inputs 406C, 406D. The input signal positive polarity $V_{IP}$ 410A and input signal negative polarity $V_{IN}$ 410B are input to each circuit block as well. Signal 408C from odd output positive polarity $S_{OP}$ 404C is connected to various inputs and gated with positive clock input 406A to provide a clock gating function operable to power up or power down the associated dynamic comparator. Signal 408D from odd output negative polarity $S_{ON}$ 404D is connected to various inputs and gated with positive clock input 406B to provide a clock gating function operable to power up or power down the associated dynamic comparator. Signal 408A from even output negative polarity $S_{EN}$ 404A is connected to various inputs and gated with positive clock input 406C to provide a clock gating function operable to power up or power down the associated dynamic comparator. Signal 408B from even output positive polarity $S_{EP}$ 404B is connected to various inputs and gated with positive clock input 406D to provide a clock gating function operable to power up or power down the associated dynamic comparator.

Figure 5:
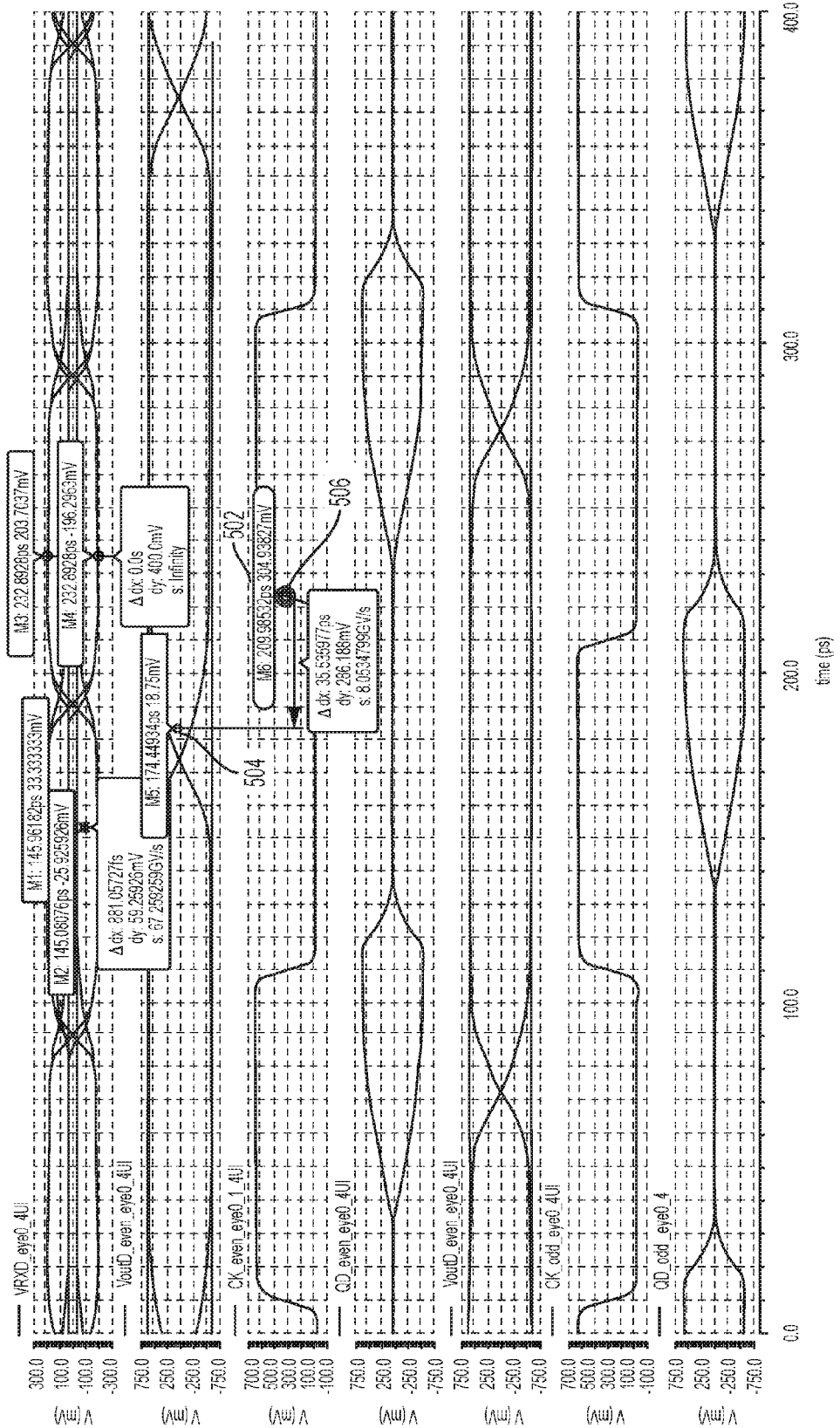
FIG. 5 is an exemplary eye diagram of operation of an embodiment of speculative DFE circuitry.

An exemplary eye diagram of operation of the embodiment of speculative DFE circuitry 400 shown in FIG. 4 is shown in FIG. 5. As shown in this example, the salient point is the timing margin 502 from the time the output is determined 504 to the next clock edge 506. In this example, a timing margin 502 of about 35 ps is achieved.

Examples of applications of embodiments of the present invention may include being implemented in a multi-drop on-chip transceiver. For example, the communication channel may be a 1 cm on-chip interconnect. Energy consumption may be reduced by implementing embodiments of the present invention. For example, energy consumption as measured per bit and distance (such as J/bit/m) may be reduced to achieve an energy consumption below, for example, 10 fJ/b/mm. The DFE equalization at the receiver may be helpful because of equalization performed by the transmitter that is optimized at the farthest receiver. This may result in over-equalization at receives that are located closer to the transmitter. Accordingly, receivers located closer to the transmitter may benefit from a DFE equalization which corresponds to an improved bit-error-rate performance.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A Speculative Decision Feedback Equalizer (DFE) comprising:
    a plurality of speculative paths;
    circuitry comprising a first clock gating and de-multiplexing select logic, wherein the first clock gating and de-multiplexing select logic is adapted to:
        receive from a multiplexer a current decision,
        output, based at least in part on the current decision, a power signal to provide power to a speculative path that will take a next decision based on the current decision, and
        output, based at least in part on the current decision, a selection signal to the multiplexer; and
    circuitry comprising a second clock gating and de-multiplexing select logic, wherein the second clock gating and de-multiplexing select logic is adapted to keep at least one other speculative path in a reset state with low or reduced power consumption.

2. The Speculative Decision Feedback Equalizer of claim 1, further comprising:
    circuitry to keep all other speculative paths in a reset state with low or reduced power consumption.

3. The Speculative Decision Feedback Equalizer of claim 1, wherein:
    each speculative path comprises a dynamic comparator.

4. The Speculative Decision Feedback Equalizer of claim 1, wherein:
    the first clock gating and de-multiplexing logic comprises even clock gating and de-multiplexing select logic; and
    the second clock gating and de-multiplexing logic comprises odd clock gating and de-multiplexing select logic.

5. The Speculative Decision Feedback Equalizer of claim 4, further comprising:
    circuitry to keep all other speculative paths in a reset state with low or reduced power consumption.

6. A Speculative Decision Feedback Equalizer (DFE) comprising:
    a plurality of dynamic comparators, each dynamic comparator adapted to compare an input signal with a different speculative value of a previously determined signal and outputting a comparison result;
a multiplexer adapted to select a comparison result based on the actual value of the previously determined signal; and
circuitry comprising a first clock gating and de-multiplexing select logic, wherein the first clock gating and de-multiplexing select logic is adapted to:
receive from the multiplexer a speculative value of the previously determined signal,
output, based at least in part on the speculative value, a power signal adapted to provide power to a dynamic comparator that is comparing the input signal with the speculative value of the previously determined signal that corresponds to the actual value of the previously determined signal, and
output, based on the speculative value, a selection signal to the multiplexer, wherein the selection of the comparison result, by the multiplexer, is based at least in part on the selection signal; and
circuitry comprising a second clock gating and de-multiplexing select logic, wherein the second clock gating and de-multiplexing select logic is adapted to keep at least one other dynamic comparator in a reset state with low or reduced power consumption.

7. The Speculative Decision Feedback Equalizer of claim 6, further comprising:
circuitry adapted to keep all other speculative paths in a reset state with low or reduced power consumption.

8. The Speculative Decision Feedback Equalizer of claim 6, wherein:
the first clock gating and de-multiplexing logic comprises even clock gating and de-multiplexing select logic;
the second clock gating and de-multiplexing logic comprises odd clock gating and de-multiplexing select logic.

9. The Speculative Decision Feedback Equalizer of claim 8, further comprising:
circuitry adapted to keep all other speculative paths in a reset state with low or reduced power consumption.

10. A communications device comprising:
a communication channel;
a Speculative Decision Feedback Equalizer (DFE) in the communication channel, comprising:
a plurality of speculative paths;
circuitry comprising a first clock gating and de-multiplexing select logic, wherein the first clock gating and de-multiplexing select logic is adapted to:
receive from a multiplexer a current decision,
output, based at least in part on the current decision, a power signal adapted to provide power to a speculative path that will take a next decision based on the current decision, and
output, based at least in part on the current decision, a selection signal to the multiplexer; and
circuitry comprising a second clock gating and de-multiplexing select logic, wherein the second clock gating and de-multiplexing select logic is adapted to keep at least one other speculative path in a reset state with low or reduced power consumption.

11. The communications device of claim 10, further comprising:
circuitry adapted to keep all other speculative paths in a reset state with low or reduced power consumption.

12. The communications device of claim 10, wherein:
each speculative path comprises a dynamic comparator.

13. The communications device of claim 10, wherein:
the first clock gating and de-multiplexing logic comprises even clock gating and de-multiplexing select logic; and
the second clock gating and de-multiplexing logic comprises odd clock gating and de-multiplexing select logic.

14. The communications device of claim 10, wherein:
each of the plurality of speculative paths comprises a dynamic comparator, each dynamic comparator adapted to compare an input signal on the communication channel with a different speculative value of a previously determined signal and outputting a comparison result;
wherein the circuitry comprising the first clock gating and de-multiplexing logic comprises circuitry adapted to provide power to a dynamic comparator that is comparing the input signal with a speculative value of the previously determined signal that corresponds to the actual value of the previously determined signal; and
the circuitry comprising the second clock gating and de-multiplexing select logic comprises circuitry adapted to keep at least one other dynamic comparator in a reset state with low or reduced power consumption.

15. The Speculative Decision Feedback Equalizer of claim 14, further comprising:
circuitry adapted to keep all other speculative paths in a reset state with low or reduced power consumption.

16. The Speculative Decision Feedback Equalizer of claim 14, further comprising:
circuitry adapted to keep all other speculative paths in a reset state with low or reduced power consumption.

* * * * *